United States Patent

[11] 3,557,880

| [72] | Inventors | Ary Van Der Lely<br>10 Weverskade, Maasland;<br>Cornelis Johannes Gerardus Bom, 36,<br>Esdoorlaan, Rozenburg, Netherlands |
|---|---|---|
| [21] | Appl. No. | 673,358 |
| [22] | Filed | Oct. 6, 1967 |
| [45] | Patented | Jan. 26, 1971 |
| [32] | Priority | Oct. 13, 1966 |
| [33] | | Netherlands |
| [31] | | 6614376 |

[54] SOIL-CULTIVATING IMPLEMENTS
9 Claims, 6 Drawing Figs.

[52] U.S. Cl. ................................................. 172/91,
172/112, 172/123, 172/125
[51] Int. Cl. ..................................................... A01b 33/00
[50] Field of Search .......................................... 172/112,
123, 45, 91, 545, 79, 94, 528, 117; 74/378; 172/39

[56] References Cited

UNITED STATES PATENTS

| 3,029,879 | 4/1962 | Wells | 172/112X |
| 1,008,169 | 11/1911 | Marth | 74/378 |
| 1,676,646 | 7/1928 | Funk | 172/123X |
| 1,893,871 | 1/1933 | Romera | 172/91 |
| 2,241,675 | 5/1941 | Rhinehart | 172/79X |
| 2,476,836 | 7/1949 | Cleland | 172/545 |

FOREIGN PATENTS

| 674,769 | 1952 | Great Britain | 172/39 |
| 15,897 | 10/1890 | Great Britain | 172/45 |

Primary Examiner—Robert E. Bagwill
Assistant Examiner—Stephen C. Pellegrino
Attorney—Mason, Mason & Albright ABSTRACT: The soil-working members can be moved through the ground in a direction which is the same or opposite to the implement's direction of travel with a transmission adjustment. The soil-working members can be pivotally mounted between two supports so that they extend transverse to the direction of travel.

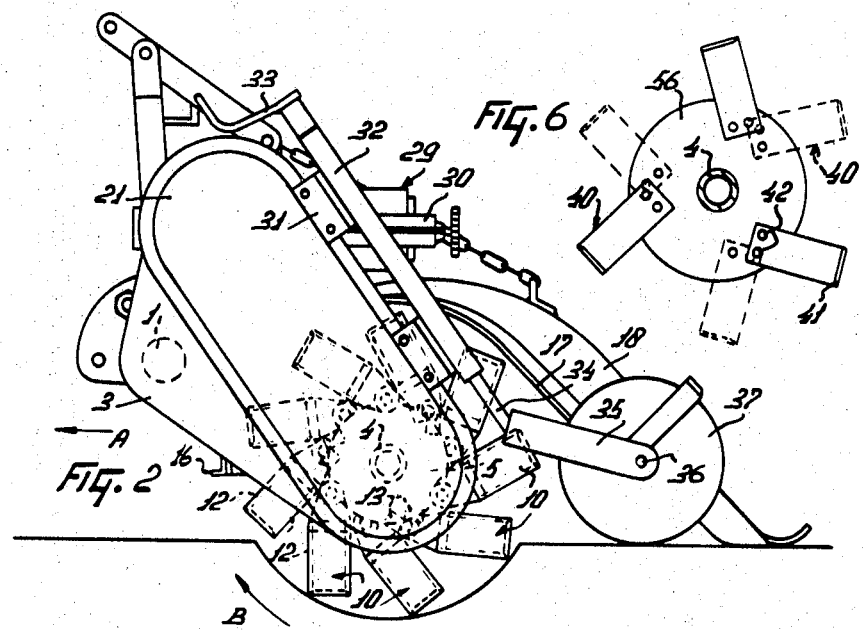

SOIL-CULTIVATING IMPLEMENTS

This invention relates to soil-cultivating implements of the kind comprising a movable frame, a shaft rotatably mounted in the frame and carrying a plurality of soil-working members.

According to the invention, there is provided a soil-cultivating implement comprising a movable frame, a shaft rotatably mounted in the said frame and carrying a plurality of soil-working members, a hood being provided which at least partly surrounds said shaft and said members, a mechanism being provided for transmitting rotary motion to the said shaft in a direction whereby the soil-working members move through the ground in a direction opposite to the intended direction of travel of the implement.

For a better understanding of the invention, and to show how the same may be carried into effect, reference will now be made, by way of example, to the accompanying drawings, in which:

FIG. 2 is a side elevation of the implement of FIG. 1;

FIG. 3 is a rear elevation of soil-engaging parts of the implement of FIGS. 1 and 2, some members being omitted from the view for the sake of clarity;

FIG. 4 is a scrap plan view of alternative parts which may be employed in the implement of FIGS. 1 to 3;

FIG. 5 is an elevation as seen in the direction indicated by the line V-V of FIG. 4; and FIG. 6 is a plan view similar to FIG. 5 but shows a further alternative construction of certain parts of the implement.

Figure 1:
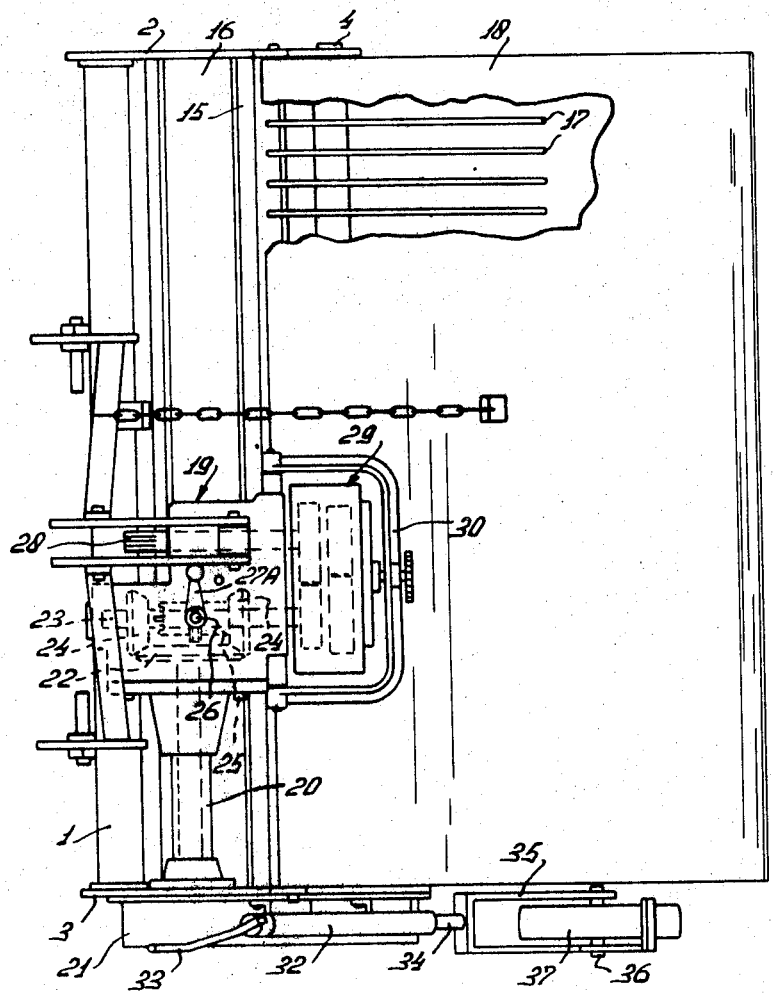
FIG. 1 is a plan view of a cultivating implement in accordance with the invention.

Referring to FIGS. 1 to 3 of the drawings, the cultivating implement which is illustrated has a frame which includes a frame beam 1 that extends horizontally perpendicular to the intended direction of operative travel of the implement which is indicated by an arrow A in FIG. 2 of the drawings. The opposite ends of the frame beam 1 are provided with cheek plates 2 and 3 that extend generally downwardly and rearwardly from the beam relative to the direction A. A rotary shaft 4 that extends parallel to the beam 1 is turnably mounted in aligned bearings that are mounted towards the lowermost ends of the two plates 2 and 3. Circular supporting plates 5 are mounted along the rotary shaft 4 in regularly spaced relationship, each neighboring pair of plates 5 supporting a group of three shafts 6 that are rotatably mounted in bearings 6A carried by the supporting plate 5 in question. It will be apparent that each shaft 6 of one group is at the same distance from the rotary shaft 4 as its fellows and that the three shafts 6 are spaced at 120° intervals from one another around the longitudinal axis of the rotary shaft 4. It will also be apparent from the drawings that the shafts 6 of one group are each displaced around the axis of the shaft 4 relative to the corresponding shafts of the neighboring group so that, considered lengthwise of the rotary shaft 4, there are, in effect, three rows of shafts 6 that wound approximately helically around said shaft 4.

Each shaft 6 is surrounded by a sleeve 7 having projections 8 adjacent its opposite ends to which projections the limbs 9 of a rigid U-shaped bracket 10 are fastened. The web 11 of each bracket 10 extends parallel to the rotary shaft 4, each bracket 10 affording a soil-working member of the implement. The brackets 10 are of symmetrical construction and, as can be seen in the drawings, both of their free opposite edges are sharpened to form cutting edges 12. The supporting plates 5 carry stops 13 to limit pivotal displacements of the brackets 10 about the shafts 6. Resilient washers 14 or other resilient members surround the shafts 6 between the bearings 6A and the sleeves 7 to ensure that said sleeves 7 cannot turn freely about the shafts 6 but can only do so against resilient opposition.

A bar 15 of L-shaped cross section interconnects approximately the midpoints of the cheek plates 2 and 3 in such a way that it extends parallel to the frame beam 1. A screening hood or baffle 16 for earth displaced by the brackets 10 during use of the implement is secured to the bar 15 in such a way as to partly surround the rotary shaft 4 and the brackets 10 that are carried thereby. The hood or baffle 16 extends downwardly in front of the bar 15, its lowermost leading edge being visible in FIG. 2 of the drawings. The hood or baffle 16 concentrically surrounds the shaft 4 through an angle subtending not more than 90° at said shaft, the hood or baffle being extended rearwardly of the bar 15, relative to the direction A, by a plurality of relatively spaced resilient rods 17 whose leading ends are secured to the bar 15. The rods 17 are curved so as to extend approximately concentrically around the rotary shaft 4, rearmost parts of said rods being inclined downwardly, and rearwardly towards the ground relative to the direction A. The rods 17 are arranged in open gridlike relationship but above them is arranged an unbroken pivotably mounted screening hood or baffle 18 the lowermost and rearmost, relative to the direction A, end of which is disposed at approximately ground level.

A gear casing or gear box 19 is carried by the frame beam 1 at a point spaced a short distance towards one end of the beam from its center. The gear box 19 accommodates a rotary output shaft 20 that extends parallel to the frame beam 1 and that is in driving connection with the rotary shaft 4 by way of transmission members contained within a guard casing 21. The end of the shaft 20 that is located within the gear box 19 carries a bevel pinion 22 whose teeth are in mesh with those of two oppositely directed bevel pinions 24 that are freely rotatably mounted on a shaft 23 extending substantially parallel to the direction A. A sleeve 25 surround the shaft 23 between the two pinions 24 and is movable axially, but not rotatably, relative to said shaft 23, splines or the like being provided for this purpose. The sleeve 25 is formed with a groove which cooperates with a member carried at the lower end of a shaft 26 that is turnable in the casing of the gear box 19 with the aid of a projecting lever 27A. The bevel pinions 24 are rotatably, but not axially, movable on the shaft 23 and the ends thereof that face the relatively opposite ends of the sleeve 25 are formed with dogs, claws or the like adapted for engagement with mating dogs, claws or the like formed at opposite ends of said sleeve. One set of the dogs, claw or the like at one end of the sleeve 25 can be seen in FIG. 1 of the drawings.

The rearmost end of the shaft 23, relative to the direction A, projects from the gear box 19 and is formed with splines or the like that are not visible in the drawings. A rotary input shaft 28 is journaled in the gear box 19 so as to extend parallel to the shaft 23, both of its opposite ends that project from the gear box 19 being splined or otherwise keyed in a similar manner to the rearmost projecting end of the shaft 23. A gear unit 29 which contains a number of intermeshing gear wheels can be engaged with the rearmost splined ends of the two shafts 23 and 28 in several different ways each one of which drivingly connects the shaft 28 to the shaft 23 with a corresponding transmission ratio. The details of the construction of the gear unit 29 are not necessary for an understanding of the present invention but it will be noted that FIG. 1 of the drawings shows the unit mounted in one of its possible operative positions, said positions being maintained by a pivotable yoke 30 carrying a clamping screw. It will be apparent that the particular position of the gear unit 29 which is chosen will determine the speed of rotation of the rotary shaft 4 in response to a given speed of rotation which is transmitted to the input shaft 28. The leading end of the shaft 28 is, of course, intended to be placed in driven connection with the power takeoff shaft of an agricultural tractor or other vehicle with the aid of an intermediate transmission shaft (not shown) having universal joints at its opposite ends.

A tube 32 is secured to the rear of the guard casing 21 by means of a pair of relatively spaced supports 31. A screw spindle 33 having a handle at its uppermost end is rotatably mounted in the tube 32 and is engaged with the correspondingly screw-threaded upper end (not visible) of a further tube 34, entered telescopically in the lower end of the larger tube 32, in such a way that the degree of extension of the tube 34 from the lowermost end of the tube 32 can be controlled by rotating the spindle 33 in an appropriate direction.

The lowermost end of the further tube 34 carries an approximately horizontally disposed fork 35 the free ends of the limbs of which support a horizontal axle 36 about which a ground wheel 37 is rotatable between the limbs of the fork. As can be seen from FIGS. 1 and 2 of the drawings, the frame beam 1 and the gear casing 19 are provided with a coupling member arranged to enable the cultivating implement to be connected to the three-point lifting device or hitch of an agricultural tractor or other vehicle which is employed to move and drive the implement during its use.

FIGS. 4 and 5 of the drawings show an alternative construction in which each circular supporting plate 5 carries six strip-shaped soil-working members 38 that are equidistantly spaced around the periphery of the plate 5. Each soil-working member 38 is relatively broad in the region thereof which is fastened to the corresponding plate 5, said member tapering until it reaches a point at which it is bent over through 90° to form a blade 39 that extends parallel to the rotary shaft 4. The tapering portion of each member 38 is contained in a plane that is substantially perpendicular to the axis of the shaft 4 and its opposite edges, and all the edges of the blades 39, are formed as knife edges.

In the embodiment which is illustrated in FIG. 6 of the drawings, the rotary shaft 4 has a plurality of circular supporting plates 56 fastened to it at regular intervals therealong, each plate 56 having three soil-working members 40 secured to it at regular intervals around its periphery with the aid of pairs of bolts 42. As can be seen in FIG. 6 of the drawings, each member 40 is secured to the corresponding plate 56 in such a way that its length is nonradially disposed with respect to the axis of the rotary shaft 4, the edge of each member 40 which is furthest from the shaft 4 being formed as a knife or cutting edge 41. The circular supporting plates 56 are formed with alternative sets of holes to receive the bolts 42 so that the soil-working members 40 can be secured to the plates 56 in either the positions shown in full lines in FIG. 6 of the drawings or the positions thereof that are shown in broken lines in that FIG. The members 40 are fastened to the plates 56 in one position, or the other, in dependence upon the direction in which the shaft 4 is rotated during use of the cultivating implement as will hereinafter be described.

When the cultivating implement which has been described is to be used, it is mounted on the three-point lifting device or hitch of an agricultural tractor or other vehicle and its rotary input shaft 28 is placed in driven connection with the power takeoff shaft of the same tractor or other vehicle by way of the intermediate shaft which has previously been mentioned. The lever 27A is employed to place the dogs or claws at one end of the sleeve 25 in engagement with the mating dogs or claws of the corresponding bevel pinion 24 so that the shaft 4 may be rotated in the direction B indicated in FIG. 2 of the drawings or, if desired, in a relatively opposite direction. Assuming that the shaft 4 rotates in the direction B, it will be evident that the soil-working members that are afforded by the brackets 10 move through the soil in a forward direction relative to the direction A and thus carry displaced soil forwardly and upwardly beneath the hood or baffle 16. The displaced soil is eventually thrown rearwardly against the resilient rods 17 and any constituents thereof such as large stones, roots, pieces of wood or other agricultural debris that are too large to pass between the rods slide downwardly along them to the base of the cavity which has just been excavated by the soil-working brackets 10. Fine soil, on the other hand, passes between the rods 17 and is only deflected downwardly by the unbroken hood or baffle 18 in such a way that it falls back to the ground on top of the agricultural debris which was unable to pass between the rods 17, thus effectively burying such debris beneath the soil surface.

Upon adjusting the lever 27A to bring the other one of the two bevel pinions 24 into engagement with the sleeve 25, the shaft 4 will rotate in a direction opposite to the direction B with the same direction of rotation of the input shaft 28. The soil-working brackets 10 will then move rearwardly through the soil with respect to the direction A. Soil which they displace is thus thrown upwardly and rearwardly from the ground towards the hood or baffle 18, said hood or baffle tending to produce a fairly smooth seed bed by virtue of the contact of its lowermost and rearmost edge with the ground surface. As previously mentioned, the hood or baffle 18 is adjustable so that, when desired, said edge can be maintained clear of contact with the ground surface. The chain which is employed to this and can be seen in FIGS. 1 and 2 of the drawings.

During rotation of the shaft 4, the bracket 10 can bear against the stops 13 carried by the supporting plates 5 or against at least one bearing 6A for the shaft 6 of a neighboring soil-working bracket in dependence upon the direction of rotation of the shaft 4. The fact that each bracket 10 has knife or cutting edges 12 on both sides enables it to work equally effectively whichever way the shaft 4 is rotating. The washers or other resilient members 14 exert a very considerable braking effect upon the pivotal movements of the soil-working brackets 10 about the shafts 6 and thus prevent said brackets from striking the stops 13 or bearing 6A with severe impacts.

When the soil-working members of FIGS. 4 and 5 of the drawings are employed, the knife or cutting edges of the blades 39 and bodies of the members 38 do not extend radially of the shaft 4 so that said members displace the soil satisfactorily in either direction of rotation of the shaft 4. When the construction illustrated in FIG. 6 is employed, the members 40 are unbolted from the plates 56 upon a change in the direction of rotation of the shaft 4 and are remounted in the alternative operative positions which have been described.

The cultivating implement which has been described enables a number of different ways of working the soil to be employed by virtue of the reversal of the direction of rotation of the shaft 4 which can be effected, the different speeds of rotation of the shaft 4 (in either direction) which can be attained by the use of the gear unit 29 and the different forms of soil-working member that can be used. In the embodiment of FIGS. 1 to 3 of the drawings, the soil-working members 10 automatically assume suitable working positions while, in the embodiment of FIGS. 4 and 5 of the drawings, the working positions of the members 38 are suitable for either direction of rotation of the shaft 4. Removal and remounting of the soil-working members 40 is required with the embodiment of FIG. 6 of the drawings upon reversal of the direction of rotation of the shaft 4. The depth of penetration of the soil-working members into the ground can be increased or decreased as required by causing the tube 34 to project a greater, or lesser, extent from the tube 32.

We claim:

1. A soil cultivation implement comprising a frame, movable over the ground in a first direction of travel, a rotary shaft journaled in said frame to extend substantially transversely of the direction of travel of said implement, a plurality of soil-working members mounted on said rotary shaft, driving means on said implement for rotating said shaft and for moving said working members forwardly through the soil in the direction of travel, a hood comprising sieve means mounted on said frame to extend above said working members and to the rear of said rotary shaft, said sieve means being positioned above the path of said soil-working members during rotation thereof, and extending, at least in part, generally concentric to said shaft, a further hood mounted on said implement to substantially overlie said first-mentioned hood, said further hood being pivotably connected to said frame at a point which lies, as seen from above, in front of the axis of rotation of said working members, the trailing end of said further hood being positionable to contact the ground during operation whereby soil is thrown upwardly against said hoods, deposited in several layers and thereafter smoothed by said trailing end.

2. A soil-cultivating implement as claimed in claim 1, wherein said driving means includes a gear mechanism connected to said rotary shaft for transmitting rotary action to same, said mechanism including an adjustable unit for rotating said shaft in both directions whereby said soil-working members are moved through the soil in either direction and soil is thrown upwardly against said hoods with fine soil passing through said sieve means.

3. An implement as claimed in claim 2, wherein said adjustable unit includes a lever movable to connect either one of two alternative pinions to a drive shaft of said driving means, said two alternative pinions being in mesh with a further pinion connected to an output shaft of said mechanism.

4. An implement as claimed in claim 3, wherein said driving means includes variable transmission means to change the transmission ratio between said drive shaft and said rotary shaft carrying said soil-working members.

5. An implement as claimed in claim 1, wherein said soil-working members are pivotable about axes which extend parallel to the axis of said shaft and each soil-working member is turnably mounted between two supports secured to said rotary shaft in relatively spaced relationship.

6. An implement as claimed in claim 4, wherein frictional arresting means is associated with said soil-working members for braking their pivotal movements about their pivotal axes.

7. An implement as claimed in claim 1, wherein said sieve means comprises an assembly of relatively spaced rods which extend to the rear of said implement, each of said rods being at least partly concentrically curved with respect to the axis of said shaft.

8. A soil-cultivating implement as claimed in claim 1, wherein a ground wheel with support is secured to said implement, said support comprising an adjustable assembly whereby the working depth of said soil-working members can be altered.

9. A soil-cultivating implement comprising a frame, a rotary shaft journaled in said frame to extend substantially transversely of the direction of operative travel of said implement, a plurality of soil-working members mounted on said rotary shaft, driving means on said implement for rotating said shaft and for moving said working members through the soil in the direction of travel, a hood comprising sieve means mounted on said frame to extend above said working members and to the rear of said rotary shaft, said sieve means being positioned above the path of said soil-working members during rotation thereof, and extending, at least in part, generally concentric to said shaft, a further hood mounted on said implement to substantially overlie said first-mentioned hood, said further hood being supported on said frame to pivot at a point which lies, as seen from above, in front of the axis of rotation of said working members, the trailing end of said hood being positionable to ride on the ground during operation whereby soil is thrown upwardly against said hoods, deposited in several layers and thereafter smoothed by said trailing end, said frame having coupling means for connection to a prime mover and said driving means including an input shaft connectable to the power takeoff of the prime mover.